United States Patent
Herman et al.

(10) Patent No.: US 11,624,302 B2
(45) Date of Patent: Apr. 11, 2023

(54) DUCKBILL AEROSOL SEPARATOR WITH ALWAYS OPEN REFINEMENT

(71) Applicant: Cummins Filtration IP, Inc., Columbus, IN (US)

(72) Inventors: Peter K. Herman, Stoughton, WI (US); Kaarthik Venkataraman, Middleton, WI (US); Vincil A. Varghese, McFarland, WI (US); Puja Karde, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/437,766

(22) PCT Filed: Feb. 21, 2020

(86) PCT No.: PCT/US2020/019175
§ 371 (c)(1),
(2) Date: Sep. 9, 2021

(87) PCT Pub. No.: WO2020/185369
PCT Pub. Date: Sep. 17, 2020

(65) Prior Publication Data
US 2022/0154608 A1     May 19, 2022

Related U.S. Application Data

(60) Provisional application No. 62/817,289, filed on Mar. 12, 2019.

(51) Int. Cl.
*F01M 13/04* (2006.01)
*B01D 45/08* (2006.01)

(52) U.S. Cl.
CPC ............. *F01M 13/04* (2013.01); *B01D 45/08* (2013.01); *F01M 2013/045* (2013.01); *F01M 2013/0433* (2013.01)

(58) Field of Classification Search
CPC ..... F01M 2013/045; F01M 2013/0433; F01M 13/04; B01D 45/08
See application file for complete search history.

(56) References Cited

U.S. PATENT DOCUMENTS 7,857,883 B2 * 12/2010 Scheckel ................ B01D 46/10
55/DIG. 19
2009/0100811 A1    4/2009 Scheckel et al.
(Continued)

FOREIGN PATENT DOCUMENTS

CN     101854999 A    10/2010
CN     103732871 A     4/2014
(Continued)

OTHER PUBLICATIONS

International Search Report and Written Opinion issued for PCT Application No. PCT/US2020/019175 dated May 4, 2020, 9 pages.
(Continued)

*Primary Examiner* — Kevin A Lathers
(74) *Attorney, Agent, or Firm* — Foley & Lardner LLP

(57) ABSTRACT

An impactor separator comprises a housing having an inlet receiving a gas-liquid stream and an outlet expelling a gas stream. The impactor separator also includes an impaction surface positioned within the housing and configured to separate liquid particles from the gas-liquid stream and a nozzle assembly positioned within the housing. The nozzle assembly includes a nozzle assembly housing portion and a plurality of nozzles extending through the nozzle assembly housing portion. Each of the plurality of nozzles includes a nozzle inlet and a nozzle outlet. The gas-liquid stream enters into the nozzle assembly housing portion, flows into the plurality of nozzles through the nozzle inlet and exits the
(Continued)

plurality of nozzles through the nozzle outlet. The plurality of nozzles accelerates the gas-liquid stream toward the impaction surface.

14 Claims, 18 Drawing Sheets

(56) References Cited

U.S. PATENT DOCUMENTS

2014/0157737 A1   6/2014  Schleiden et al.
2019/0070543 A1   3/2019  Coelho et al.

FOREIGN PATENT DOCUMENTS

CN       108026805 A    5/2018
WO    WO2017/153136    9/2017

OTHER PUBLICATIONS

Office Action issued for Chinese Patent Application No. CN 202080017635.6 dated Jun. 28, 2022, 10 pages.

* cited by examiner

DUCKBILL AEROSOL SEPARATOR WITH ALWAYS OPEN REFINEMENT

CROSS REFERENCE TO RELATED APPLICATIONS

This application is a National Phase of PCT Application No. PCT/US2020/019175 filed Feb. 21, 2020, which claims the benefit of priority to U.S. Provisional Application No. 62/817,289 filed Mar. 12, 2019. The contents of these applications are incorporated herein by reference in their entirety and for all purposes.

TECHNICAL FIELD

The present disclosure relates generally to inertial impactor separator assemblies.

BACKGROUND

Internal combustion engines generally combust a mixture of fuel (e.g., gasoline, diesel, natural gas, etc.) and air. During operation of an internal combustion engine, a fraction of combustion gases, called blowby gases, can flow out of the combustion cylinder and into the crankcase of the engine. The blowby gases can include a mixture of aerosols, oils, and air. The blowby gases are typically routed out of the crankcase via a crankcase ventilation system. To separate liquid particles from the blowby gas, an inertial gas-liquid impactor separator may be used. Using an inertial gas-liquid impactor separator, liquid particles are removed from the blowby gas by accelerating the blowby gas to high velocities through nozzles or orifices and directing the stream or aerosol against an impactor.

Using various conventional impactor separators, a cold start or cold operation may be difficult. During a cold start or operation of an engine in a very cold climate, the small orifice nozzles of the impactor separator may pose a freeze-up risk, where front builds up on a discharge side of small nozzles and begins to at least partially block the fluid flow through the nozzles. This blockage causes rising pressure drop across the separator and detrimental consequences can ensue, such as opened bypass valve (to dump unfiltered blowby and aerosol to atmosphere), blow-out dipstick, bulged valve cover, etc. The problem is most pronounced when orifice size becomes quite small, approximately less than 3 millimeters, which is unfortunate because impaction separation performance is known to improve with smaller nozzle orifice diameter. Many conventional impactor separators also require the use of various moving parts such as poppet valves, springs, rotating orifice plates, sliding pistons, etc., which are subject to on-board diagnostic requirements.

SUMMARY

Various example embodiments relate to an impactor separator comprising a housing having an inlet receiving a gas-liquid stream and an outlet expelling a gas stream. The impactor separator also includes an impaction surface positioned within the housing and configured to separate liquid particles from the gas-liquid stream and a nozzle assembly positioned within the housing. The nozzle assembly includes a nozzle assembly housing portion and a plurality of nozzles extending through the nozzle assembly housing portion. Each of the plurality of nozzles includes a nozzle inlet and a nozzle outlet. The gas-liquid stream enters into the nozzle assembly housing portion, flows into the plurality of nozzles through the nozzle inlet and exits the plurality of nozzles through the nozzle outlet. The plurality of nozzles accelerates the gas-liquid stream toward the impaction surface.

Other example embodiments relate to an impactor separator. The impactor separator is formed as part of a valve cover. The impactor separator includes a nozzle assembly positioned within the valve cover and a plurality of nozzles, each of the plurality of nozzles having a nozzle inlet and a nozzle outlet. A bottom portion of the valve cover includes an inlet receiving a gas-liquid stream. The impactor separator includes an impaction plate having an impaction surface structured to separate liquid particles from the gas-liquid stream. The gas-liquid stream enters into the valve cover, flows into the nozzles through the nozzle inlet and exits the nozzles through the nozzle outlet. The plurality of nozzles accelerate the gas-liquid stream toward the impaction surface.

Still other example embodiments relate to a nozzle assembly. The nozzle assembly includes a nozzle assembly housing portion having a longitudinal axis and multiple nozzles extending through the nozzle assembly housing portion, each of the nozzles having a nozzle inlet and a nozzle outlet. One of the nozzles is positioned along the longitudinal axis and includes an always-open orifice.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, an inertial impactor separator is shown. The inertial impactor separator includes a nozzle assembly and an impaction surface. The inertial impactor separator receives a gas-liquid stream, for example, blowby gases from an internal combustion engine. The inertial impactor separator removes liquid particles from the gas-liquid stream by moving the stream through a nozzle assembly and toward the impaction surface. The nozzle assembly increases the speed of the gas-liquid stream and forces the stream onto the impaction surface, where the stream undergoes a sharp change in direction, effectively causing a separation of liquid particles from the gas-liquid stream.

The inertial impactor separator described herein separates submicron oil aerosol from engine blowby gas at a relatively high efficiency without a moving poppet valve and/or spring and without creating excessive pressure drops at initial engine or worn-out engine flow rate conditions. The separator allows for cold start and/or cold operation of an engine without the risk of small nozzle freeze-up. The separator and nozzle assembly described herein exhibit a nearly linear pressure drop versus flow response as compared with a quadratic response of a fixed impactor. In this way, a much wider flow range at a given maximum pressure drop limit is achieved.

Figure 1:
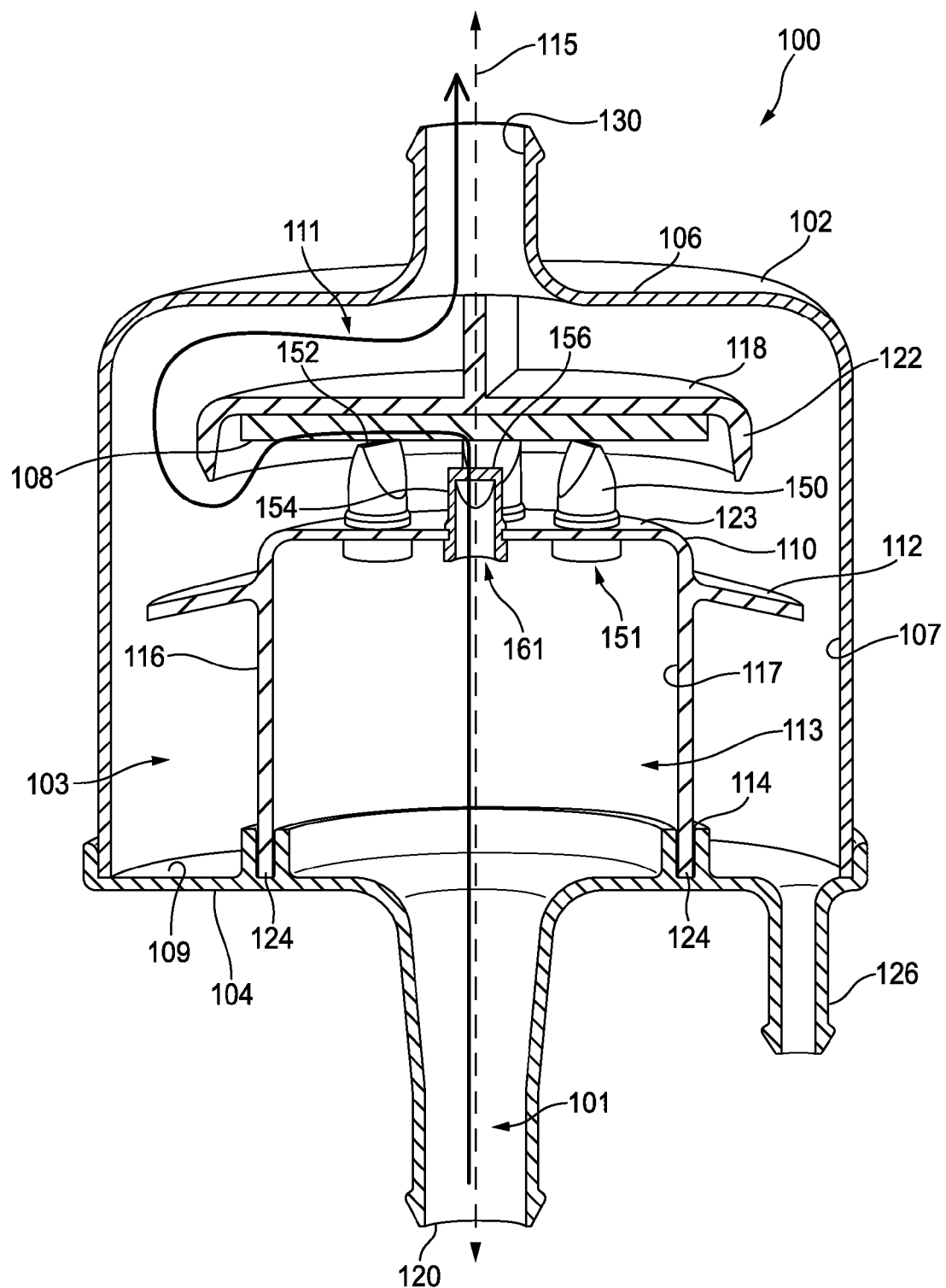
FIG. 1 shows a cross-sectional view of an inertial impactor separator, according to an example embodiment.

Referring to FIG. 1, an inertial impactor separator 100 is shown, according to an example embodiment. The impactor separator 100 includes a housing 102 having a longitudinal axis 115, an inlet 120 for receiving a gas-liquid stream 101, and an outlet 130 for discharging a gas stream 111. The housing 102 includes a housing bottom portion 104 and a housing top portion 106 coupled together to form the housing 102. A housing cavity 103 is defined by an inner surface 107 of the housing top portion 106 and an inner surface 109 of the housing bottom portion 104. In some embodiments, the housing 102 is made of a single portion.

A nozzle assembly 110 is positioned within the housing cavity 103 along the longitudinal axis 115. The nozzle assembly 110 is formed by a nozzle assembly top portion 116 and the housing bottom portion 104. The nozzle assembly top portion 116 includes a bottom end 124 configured to be inserted into (e.g., coupled to) a slot 114 formed in the housing bottom portion 104. A nozzle assembly cavity 113 is defined by an inner surface 117 of the nozzle assembly top portion 116 and the inner surface 109 of the housing bottom portion 104. In some embodiments, a flange 112 is formed with the nozzle assembly top portion 116.

Figure 2:
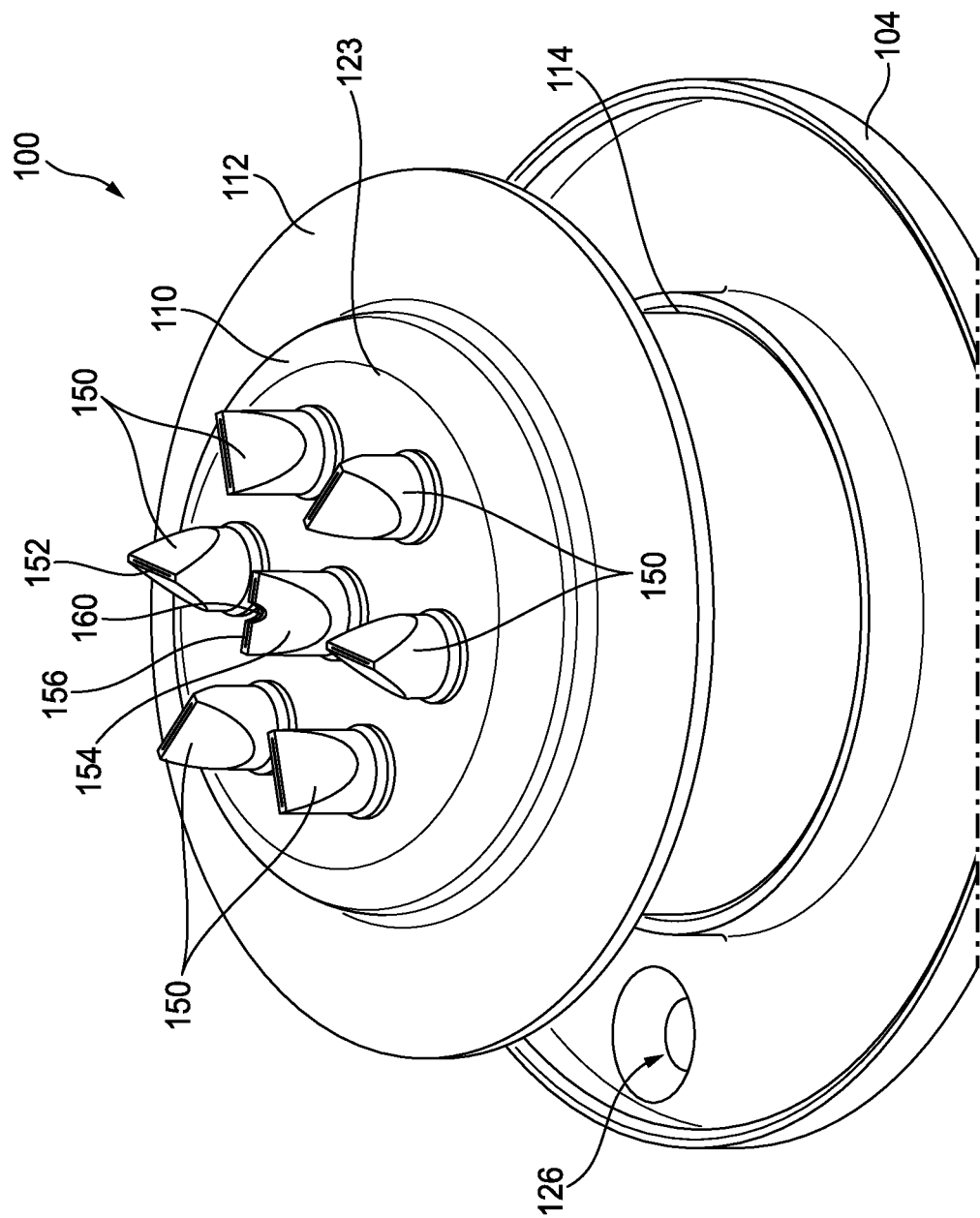
FIG. 2 shows a perspective view of a nozzle assembly for use with the inertial impactor separator of FIG. 1, according to an example embodiment.

The nozzle assembly 110 includes multiple nozzles 150 positioned in and extending through the nozzle assembly top portion 116. In the embodiment depicted in FIG. 1, the nozzles 150 are duckbill valves. In other embodiments, the nozzles 150 may be another type of nozzle. The nozzles 150 each include a nozzle inlet 151 positioned in the nozzle assembly cavity 113 and a nozzle outlet 152 positioned in the housing cavity 103. Fluid flowing through the separator 100 enters the nozzle 150 at the nozzle inlet 151 and exits the nozzle 150 through the nozzle outlet 152. As shown in FIG. 2, the nozzles are oriented such that the nozzle outlet 152 (e.g., slit) is oriented radially toward the longitudinal axis 115 or toward the center nozzle 154 described below. In this way, the potential for flow interference between fluid flow exiting each of the nozzles 150 is reduced.

The fluid flowing through the nozzles 150 flows in a direction substantially parallel with the longitudinal axis 115 of the separator 100. The nozzles 150 receive the gas-liquid stream 101 and accelerate the gas-liquid stream through the nozzles 150 toward an impaction surface 108. The fluid exiting from the nozzle outlet 152 flows in a direction substantially parallel with the longitudinal axis 115 and substantially perpendicular to the impaction surface 108. The impaction surface 108 is positioned on the underside of (e.g., as part of) an impaction plate 118 having a rim or lip 122 (e.g., downward projection at the perimeter). In some embodiments, the impaction plate 118 may be formed integral with the housing top portion 106.

The impaction surface 108 includes a fibrous and porous structure (e.g., felt-like). This type of structure improves overall separation efficiency relative to a smooth non-porous impaction surface. The fibrous and porous structure of the impaction surface 108 described herein causes both liquid particle separation from the gas-liquid stream and collection of the liquid particles within the impaction surface 108. The porous impaction surface 108 has a cut-off size for particle separation which is not as sharp as that of a smooth non-porous impactor impingement surface but improves collection efficiency for particles smaller than the cut-off size as well as a reduction in cut-off size. The porous impaction surface 108 provides a coalescing medium, such that liquid particles, once captured within the impaction surface 108, will coalesce with other liquid particles in the impaction surface 108. In addition, the accelerated gas stream and resultant high velocity of gas at and within the impaction surface creates drag forces sufficient to cause captured liquid to migrate to the outer edges of the impaction surface 108 and to shed off of the impaction surface 108.

The porous impaction surface 108 has high permeability, thereby allowing the gas-liquid stream to penetrate the porous collection surface. In some embodiments, the permeability of the porous impaction surface 108 is at least 3.0 e-10 $m^2$. In some embodiments, the permeability of the porous impaction surface 108 is at least 4.5 e-10 $m^2$. The high permeability of the porous impaction surface 108 allows the gas-liquid stream to penetrate the media of the impaction surface 108. The high permeability of the porous impaction surface 108 also causes further separation of liquid from the gas-liquid stream beyond the separation caused by the sharp direction change and increases the efficiency of the separator 100.

Several properties of the media of the impaction surface 108 contribute to the separation efficiency of the gas-liquid separator 100. Generally, a higher media permeability correlates with a higher separation efficiency for a given pressure drop across the nozzle assembly 110. In order to vary the permeability, the fiber diameter and packing density of the media of the impaction surface 108 can be varied. Generally, a smaller fiber diameter and a lower packing density lead to a higher separation efficiency for an equivalent pressure drop, as described herein below. Additionally, inertial impaction within the media of the porous impaction surface 108 is a function of both fiber diameter and the velocity distribution of the gas-liquid stream within the media. A higher velocity within the media correlates to a higher separation efficiency. The highest velocity of the gas-liquid stream occurs nearest the surface of the porous impaction surface 108. Therefore, increased separation efficiency can be provided by modifying properties of the media of the porous impaction surface 108 near its surface, where the velocity is highest and inertial impaction is greatest. In some embodiments, the fibers of the media of the porous impaction surface 108 can have a diameter of between 10 micrometers and 70 micrometers and the packing density of the media can be less than 0.2. In some embodiments, the diameter of the fibers is 18.6 micrometers and the packing density is 0.05. In some embodiments, the porous impaction surface 108 comprises at least one layer of fibers having low packing density upstream of at least one layer of fibers having high permeability.

The gas-liquid stream 101 enters through the inlet 120 of the housing 102, into the nozzle assembly cavity 113, and is accelerated through the nozzles 150 (e.g., from nozzle inlets 151 through nozzle outlets 152) and center nozzle 154 described further herein (e.g., through center nozzle inlets 161 through center nozzle outlets 156 and orifice 160) into the housing cavity 103 and toward the impaction surface 108. The gas-liquid stream 101 impacts the impaction surface 108 and sharply changes direction (e.g., from substantially parallel to the longitudinal axis 115 to substantially perpendicular to the longitudinal axis 115), thereby removing liquid particles from the gas-liquid stream 101. A gas stream 111 results that moves around the impaction plate 118, past the lip 122, and toward the outlet 130. Separated liquid particles exit or drain from the separator 100 through the liquid outlet 126.

Referring to FIG. 2, the separator 100 is shown with the housing top portion 106 and the impaction plate 118 removed. In addition to the nozzles 150, the nozzle assembly 110 also includes a center nozzle 154 positioned substantially along the longitudinal axis 115. The center nozzle 154 is similar to the other nozzles 150 and includes a center nozzle inlet 161 and a center nozzle outlet 156. The center nozzle 154 also includes an orifice 160 formed as part of the center nozzle outlet 156. The orifice 160 acts as an "always-open" feature to ensure that at least one relatively large passage is available through which the gas-liquid stream 101 can pass. In some embodiments, one or more of the nozzles 150 may also include an orifice acting as an always-open feature.

Figure 3:
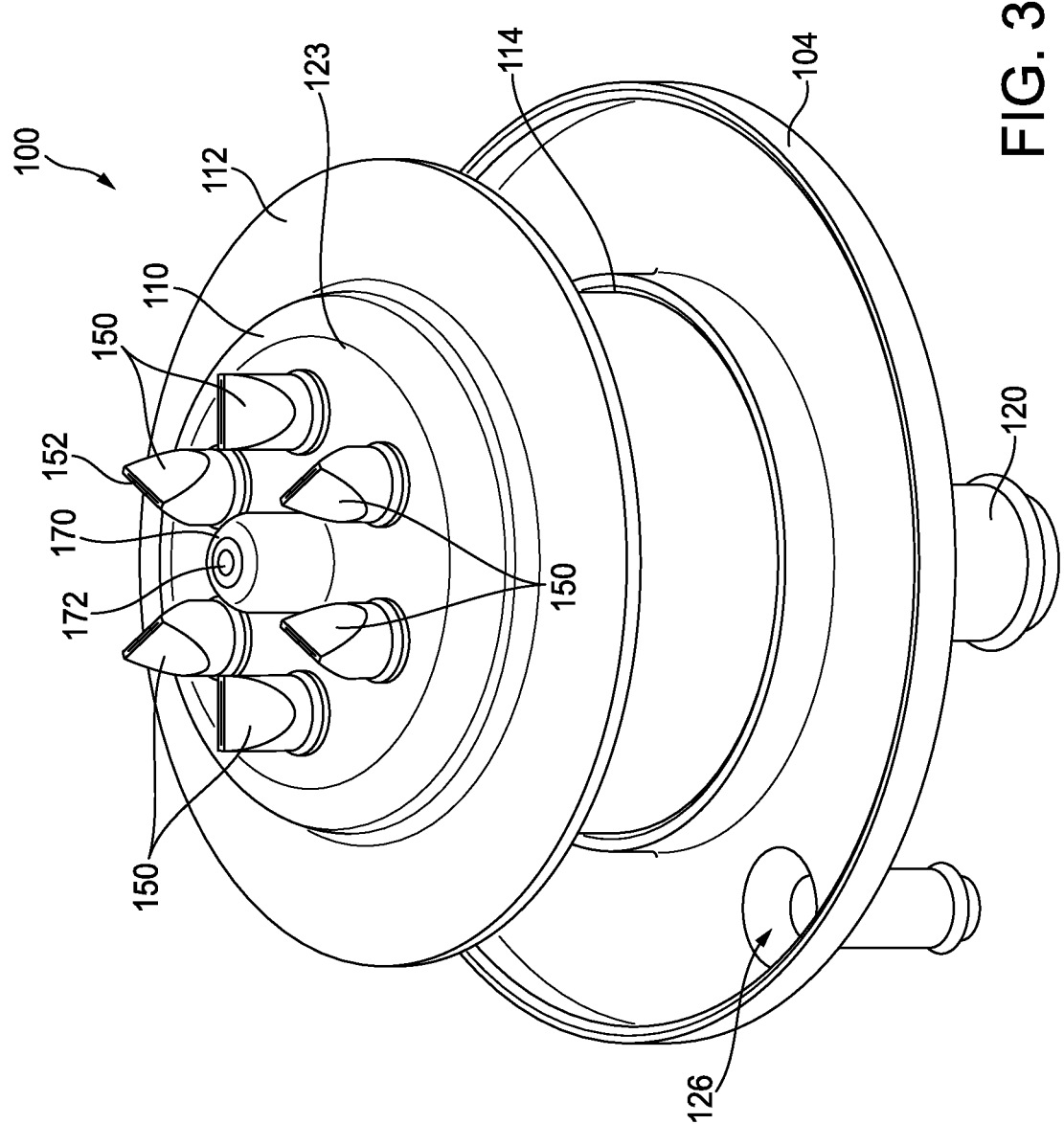
FIG. 3 shows a perspective view of another nozzle assembly for use with the inertial impactor separator of FIG. 1, according to an example embodiment.
Figure 4:
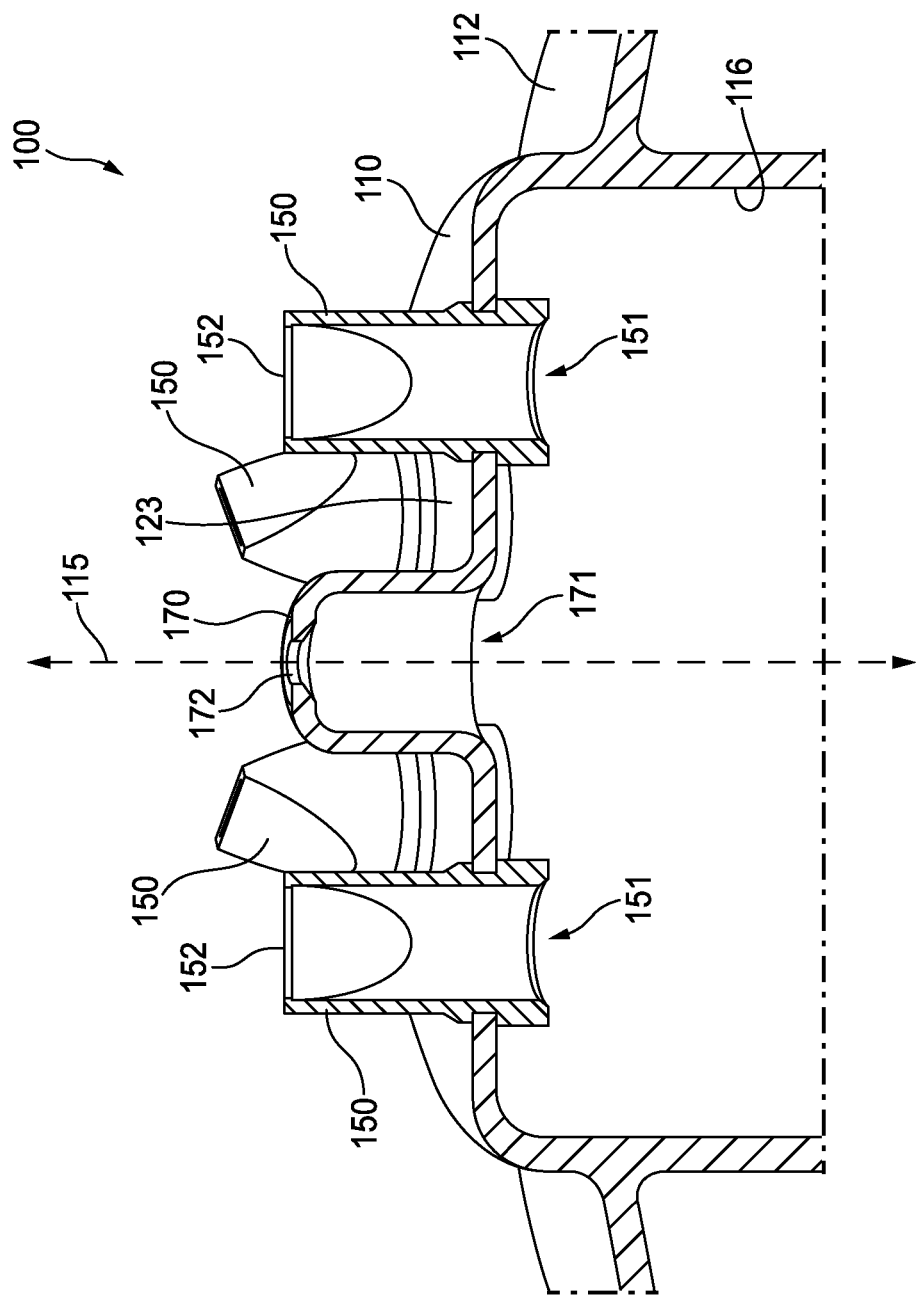
FIG. 4 shows a cross-sectional view of the nozzle assembly of FIG. 3.
Figure 5:
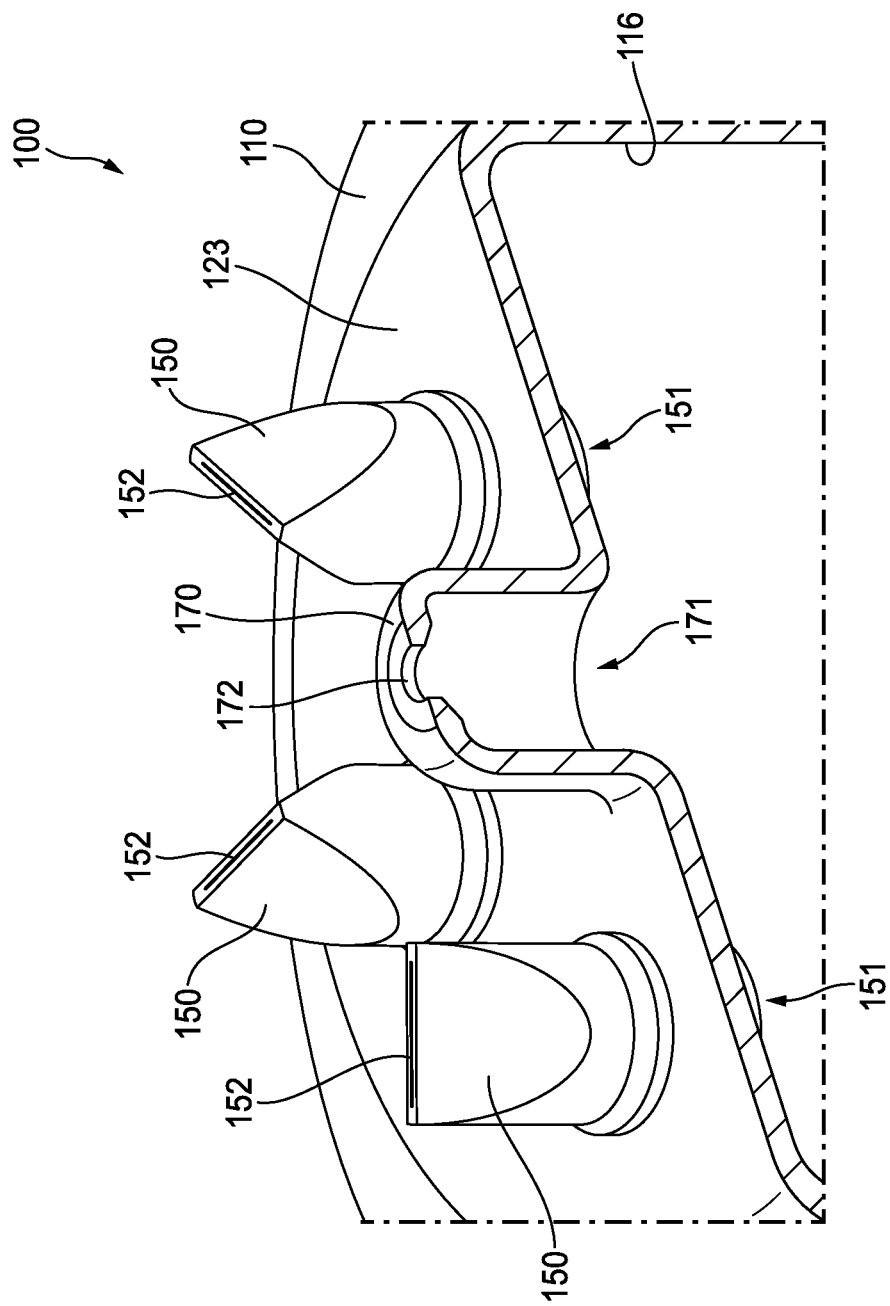
FIG. 5 shows a perspective cross-sectional view of the nozzle assembly of FIG. 3.

Referring to FIGS. 3-5, instead of a center nozzle 154 as shown in FIG. 2, the nozzle assembly 110 can include a raised portion 170 (e.g., raised from the top surface 123 of the nozzle assembly top portion 116) having a raised portion inlet 171 and an aperture 172. The gas-liquid stream 101 enters through the raised portion inlet 171 and exits through the aperture 172. The raised portion 170 is formed as part of (e.g., integral with) the nozzle assembly top portion 116. The raised portion 170 and aperture 172 act as an always-open nozzle to accelerate the gas-liquid stream 101 through the nozzle assembly 110. The raised portion 170 is raised from the top surface 123 of the nozzle assembly top portion 116 such that the distance between the aperture 172 (e.g., outlet) and the impaction surface 108 is minimized. In this way, the raised portion 170 with the aperture 172 achieves a similar jet-surface impaction distance as the other nozzles 150.

Figure 6:
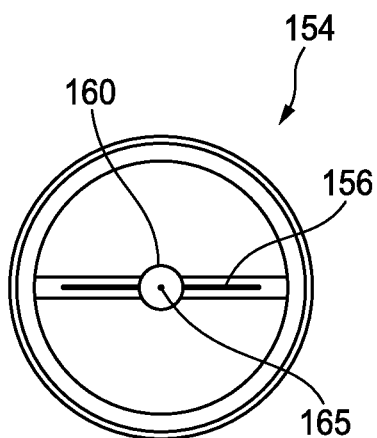
FIG. 6 shows a top view of a nozzle for use with a nozzle assembly of the inertial impactor separator of FIG. 1, according to an example embodiment.
Figure 7:
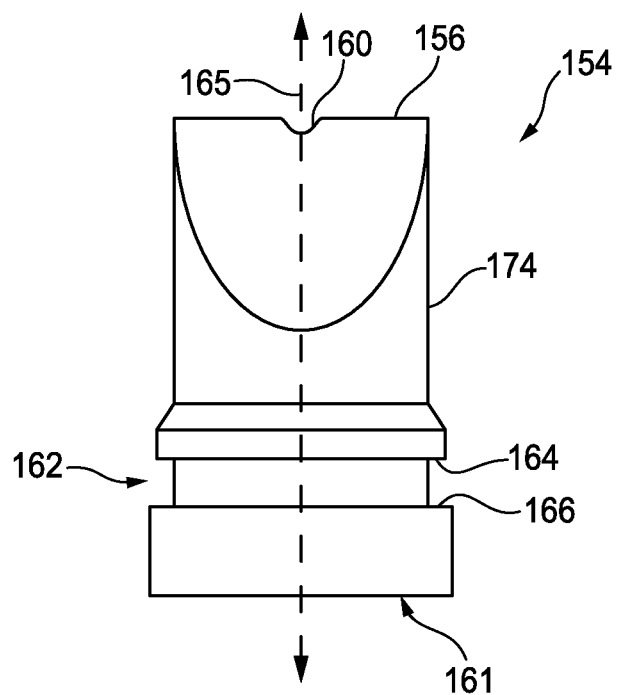
FIG. 7 shows a side view of the nozzle of FIG. 6.

Various examples of the center nozzle are shown in FIGS. 6-13. Referring to FIGS. 6-7, the center nozzle 154 has a longitudinal axis 165 and a circular orifice 160 formed in the outlet 156 and centered around the longitudinal axis 165. The orifice 160 is cut in such a way that the direction of flow through the orifice 160 is substantially perpendicular to the longitudinal axis 165 of the center nozzle 154. The center nozzle 154 includes a body 174 having an inset portion 162 having a top inset surface 164 and a bottom inset surface 166. Referring back to FIG. 1, the center nozzle 154 is inserted into the nozzle assembly top portion 116 at the inset portion 162, with the top inset surface 164 contacting the top surface 123 of the nozzle assembly top portion 116 and the bottom inset surface 166 contacting the inner surface 117 of the nozzle assembly top portion 116.

Figure 8:
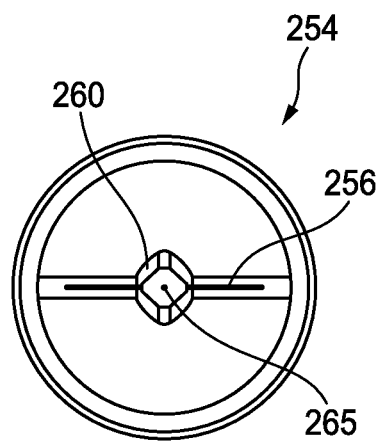
FIG. 8 shows a top view of a nozzle for use with a nozzle assembly of the inertial impactor separator of FIG. 1, according to an example embodiment.
Figure 9:
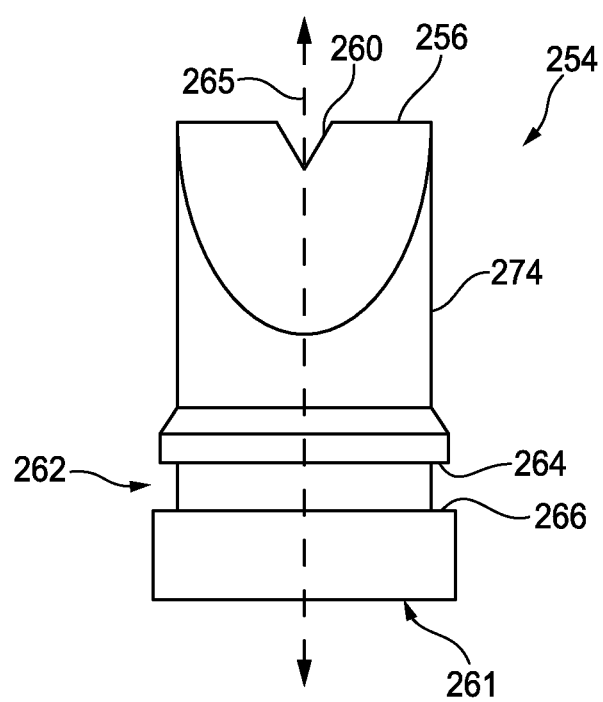
FIG. 9 shows a side view of the nozzle of FIG. 8.

Referring to FIGS. 8-9, the center nozzle 254 has a longitudinal axis 265 and an orifice 260 formed in the outlet 256 and centered around the longitudinal axis 265. The orifice 260 is diamond shaped. The orifice 260 is cut in such a way that the direction of flow through the orifice 260 is substantially perpendicular to the longitudinal axis 265 of the center nozzle 254. The center nozzle 254 includes a body 274 having an inset portion 262 having a top inset surface 264 and a bottom inset surface 266. Referring back to FIG. 1, the center nozzle 254 is inserted into the nozzle assembly top portion 116 at the inset portion 262, with the top inset surface 264 contacting the top surface 123 of the nozzle assembly top portion 116 and the bottom inset surface 266 contacting the inner surface 117 of the nozzle assembly top portion 116.

Figure 10:
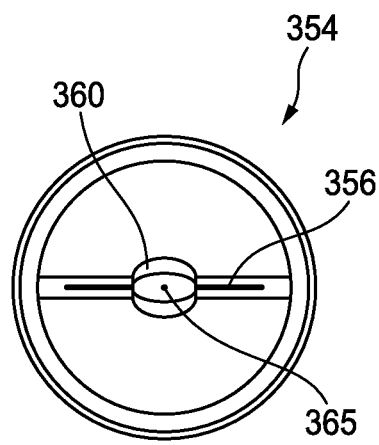
FIG. 10 shows a top view of a nozzle for use with a nozzle assembly of the inertial impactor separator of FIG. 1, according to an example embodiment.
Figure 11:
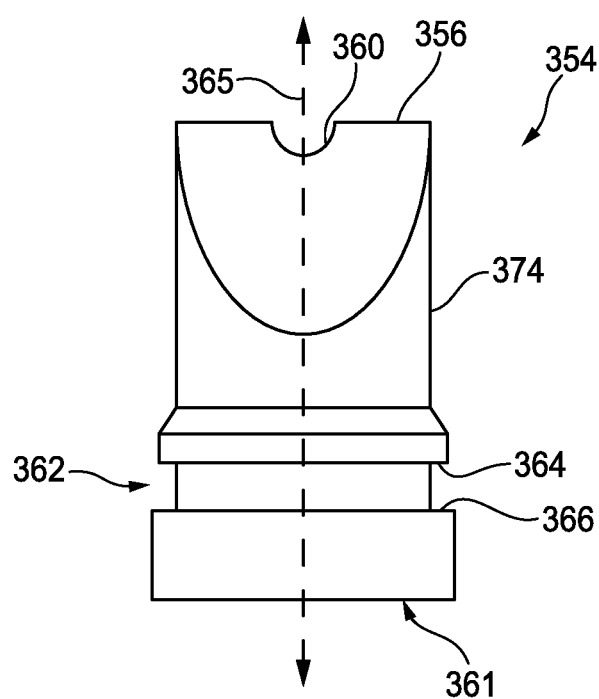
FIG. 11 shows a side view of the nozzle of FIG. 10.

Referring to FIGS. 10-11, center nozzle 354 has a longitudinal axis 365 and an orifice 360 formed in the outlet 356 and centered around the longitudinal axis 365. The orifice 360 is oval-shaped. The orifice 360 is cut in such a way that the direction of flow through the orifice 360 is substantially perpendicular to the longitudinal axis 365 of the center nozzle 354. The center nozzle 354 includes a body 374 having an inset portion 362 having a top inset surface 364 and a bottom inset surface 366. Referring back to FIG. 1, the center nozzle 354 is inserted into the nozzle assembly top portion 116 at the inset portion 362, with the top inset surface 364 contacting the top surface 123 of the nozzle assembly top portion 116 and the bottom inset surface 366 contacting the inner surface 117 of the nozzle assembly top portion 116.

Figure 12:
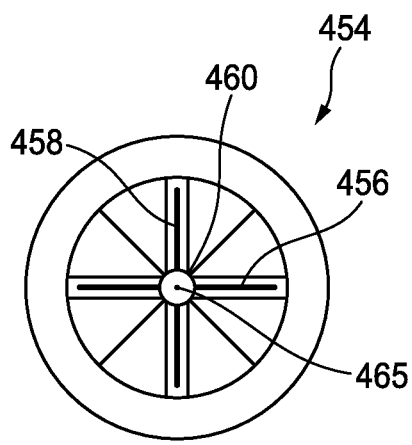
FIG. 12 shows a top view of a nozzle for use with a nozzle assembly of the inertial impactor separator of FIG. 1, according to an example embodiment.
Figure 13:
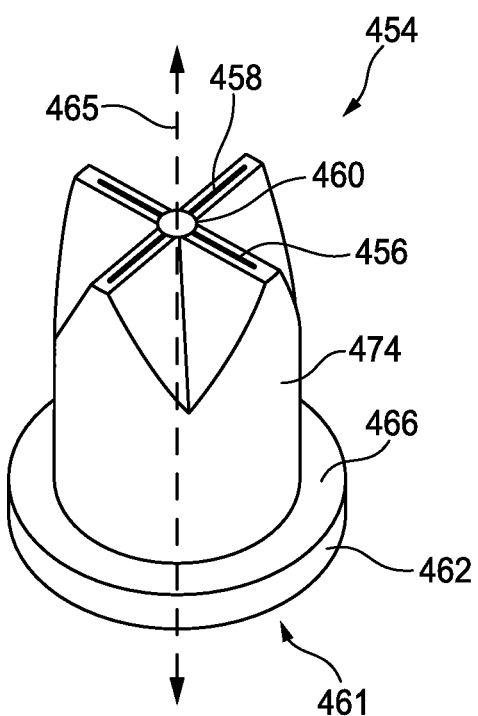
FIG. 13 shows a side view of the nozzle of FIG. 12.
Figure 14:
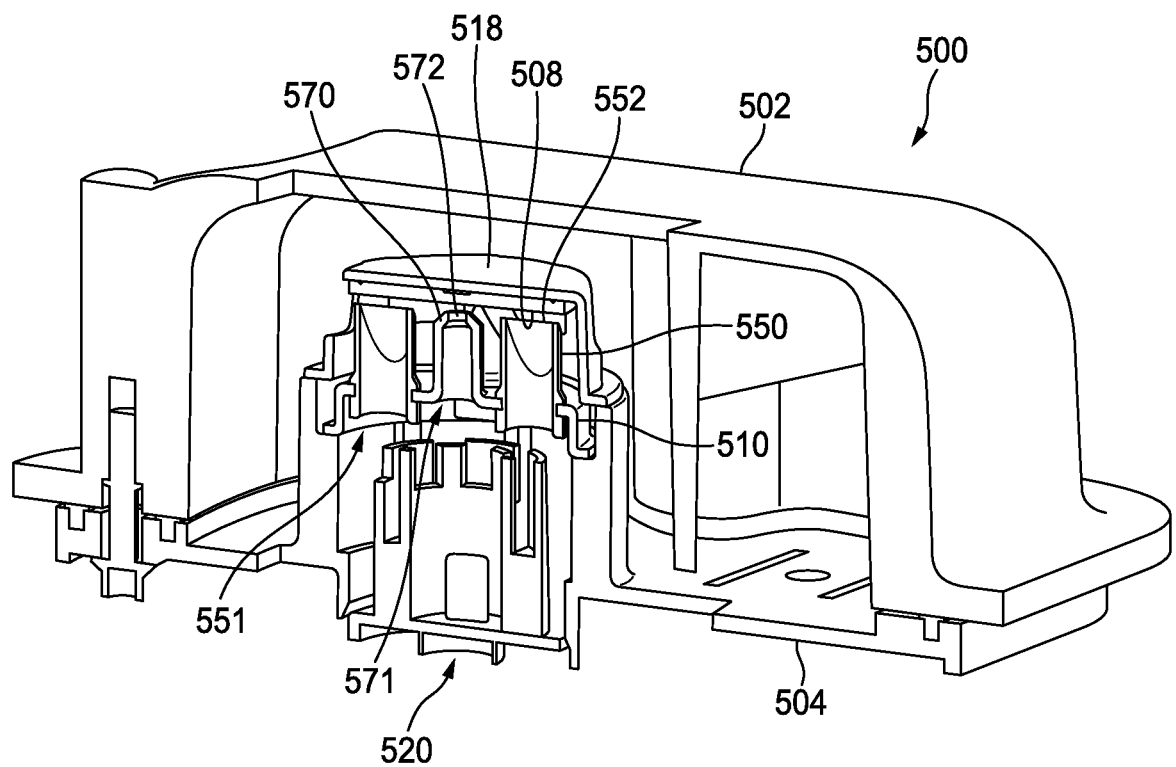
FIG. 14 shows a perspective view of the inertial impactor separator of FIG. 1 in use in a valve cover of an internal combustion engine, according to an example embodiment.
Figure 15:
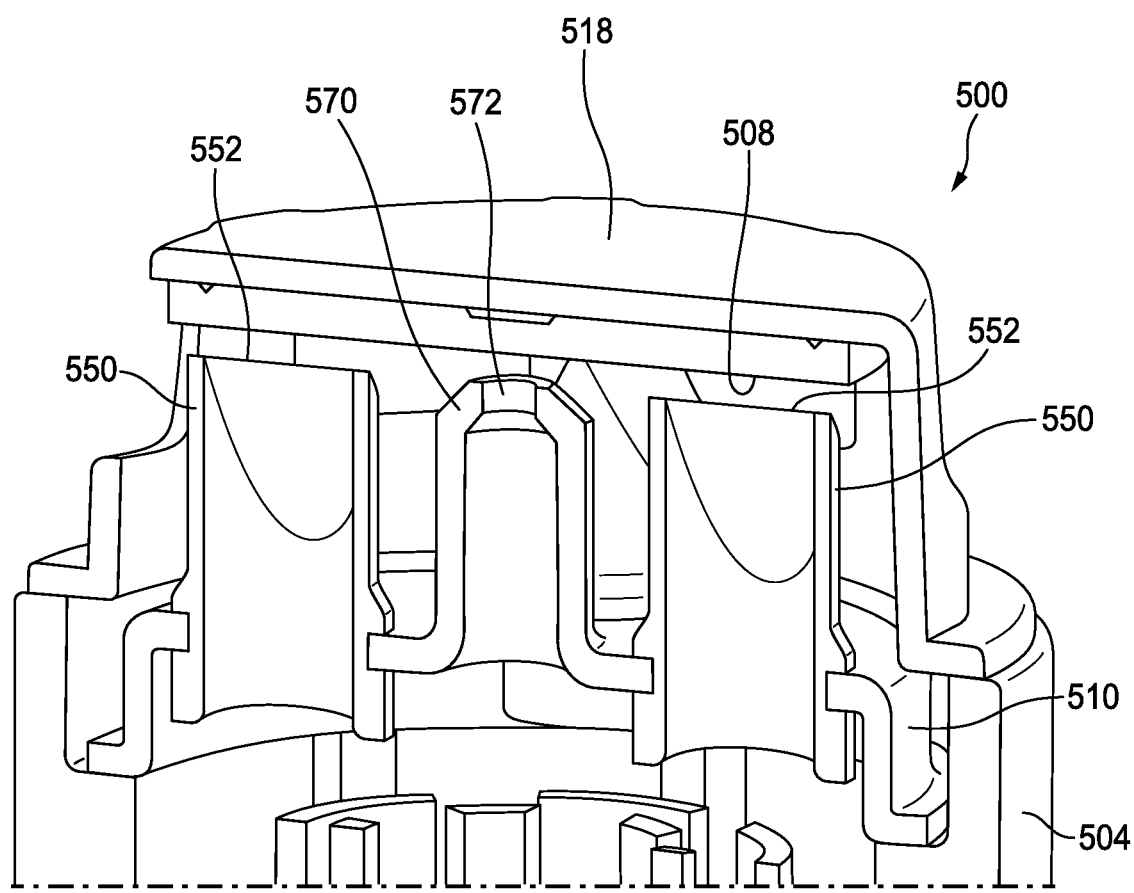
FIG. 15 shows a perspective cross-sectional view of the inertial impactor separator of FIG. 14.
Figure 16:
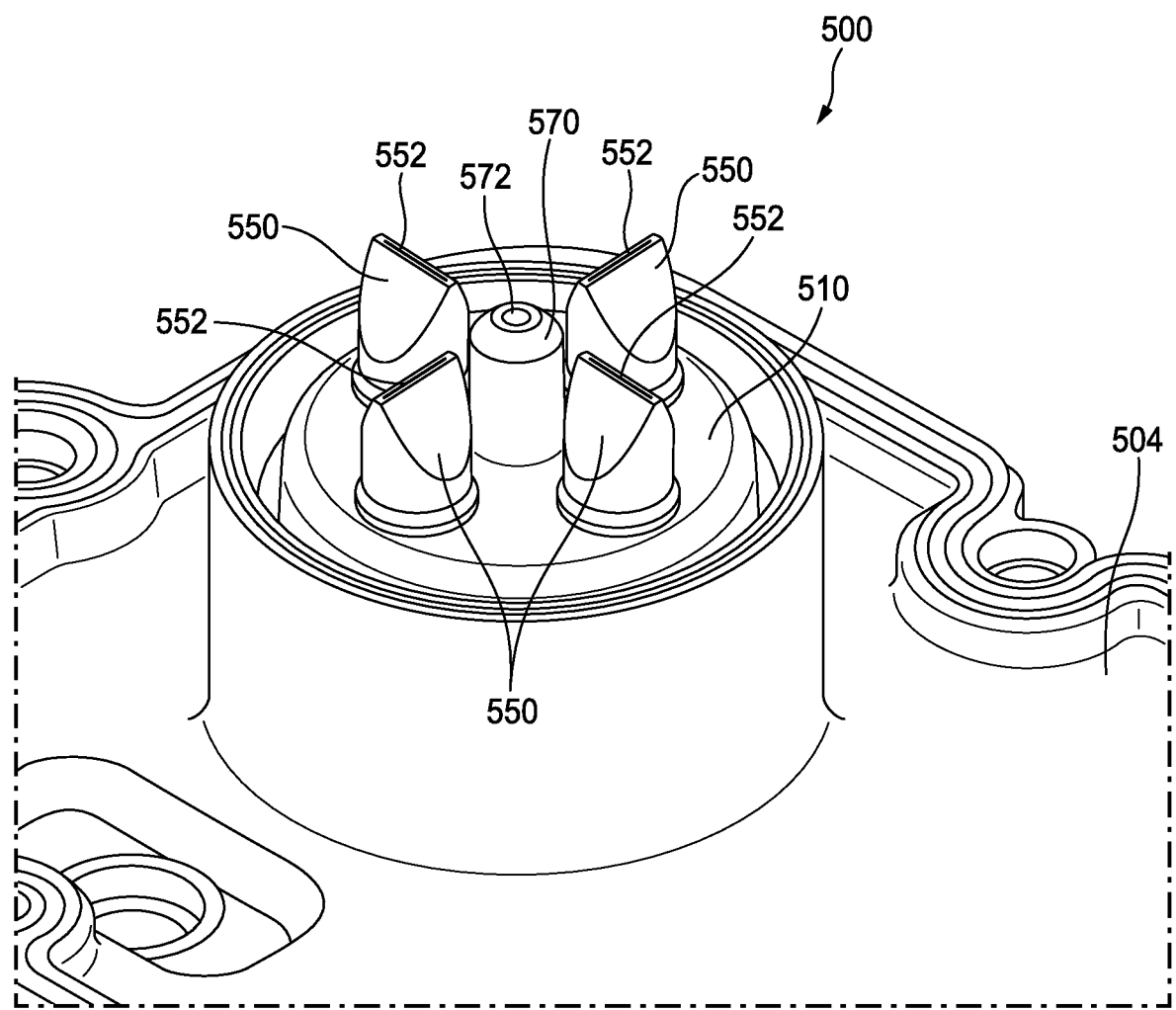
FIG. 16 shows a perspective view of a nozzle assembly of the inertial impactor separator of FIG. 14, according to an example embodiment.
Figure 17:
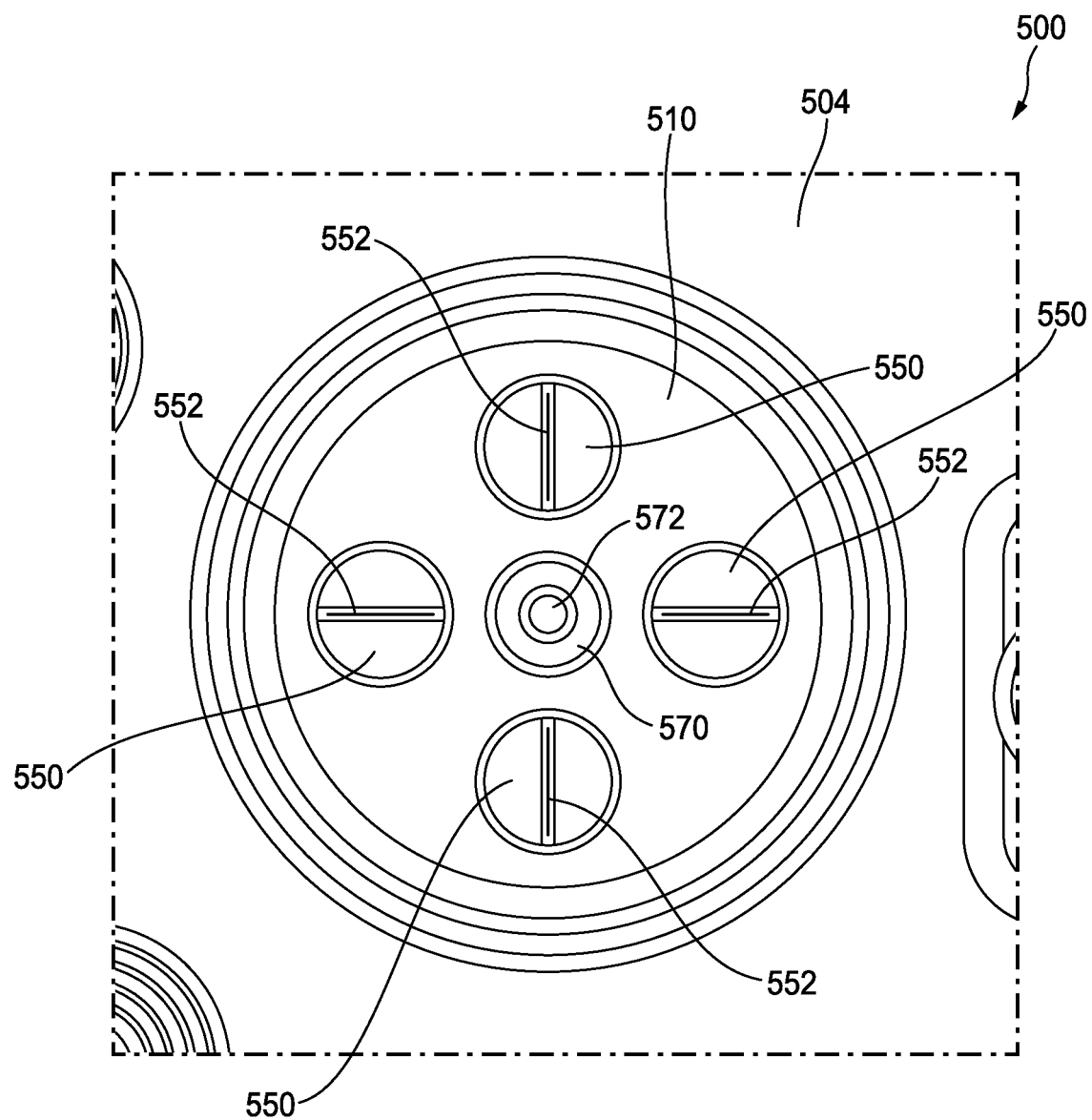
FIG. 17 shows a top view of the nozzle assembly of FIG. 16, according to an example embodiment.

Referring to FIGS. 12-13, the center nozzle 454 has a longitudinal axis 465 and an orifice 460 formed in the outlet. The outlet is formed by a first slot 456 and a second slot 458. From the top view shown in FIG. 12, the first slot 456 and the second slot 458 are substantially perpendicular to each other such that an "X" shape is formed. The orifice 460 is circular in shape and is centered around the longitudinal axis 465. The orifice 460 is cut in such a way that the direction of flow through the orifice 460 is substantially perpendicular to the longitudinal axis 465 of the center nozzle 454. The center nozzle 454 includes a body 474 having a flange portion 462 having a top surface 466. Referring back to FIG.

1, the center nozzle 454 is inserted into the nozzle assembly top portion 116, with the top surface 466 contacting the inner surface 117 of the nozzle assembly top portion 116. In some embodiments, the center nozzle 454 does not include the orifice 460 and instead only includes the first slot 456 and the second slot 458 in an "X" shape.

Referring to FIGS. 14-17, an impactor separator 500 formed as part of a valve cover 502 is shown, according to an example embodiment. The valve cover 502 includes a bottom portion 504. The bottom portion 504 includes an inlet 520 for receiving a gas-liquid stream. A nozzle assembly 510 is positioned within the valve cover 502. The nozzle assembly 510 includes multiple nozzles 550 each including a nozzle inlet 551 and a nozzle outlet 552. The depicted nozzles 550 are duckbill valves. In other embodiments, the nozzles 550 may be of another type. Fluid flowing through the separator 500 enters the nozzle 550 at the nozzle inlet 551 and exits the nozzle 550 through the nozzle outlet 552. The nozzles 550 receive the gas-liquid stream and accelerates the gas-liquid stream through the nozzles 550 toward an impaction surface 508. The distance between the nozzle outlet 552 and the impaction surface 508 may be approximately 2 millimeters (mm). The fluid exiting from the nozzle outlet 552 flows in a direction substantially perpendicular to the impaction surface 508. The impaction surface 508 is positioned on the underside of (e.g., as part of) an impaction plate 518. The impaction surface 508 separates liquid particles from the gas-liquid stream. The gas-liquid stream impacts the impaction surface 508 and sharply changes direction. A gas stream results that moves around the impaction plate 518. In addition to the nozzles 550, the nozzle assembly 510 includes a raised portion 570 having an aperture 572. The raised portion 570 is formed as part of (e.g., integral with) the nozzle assembly 510. The raised portion 570 and aperture 572 act as an always-open nozzle to accelerate the gas-liquid stream through the nozzle assembly 510. The gas-liquid stream enters through the raised portion inlet 571 and exits through the aperture 572. The diameter of the aperture 572 may be approximately 3.5 mm.

Figure 18:
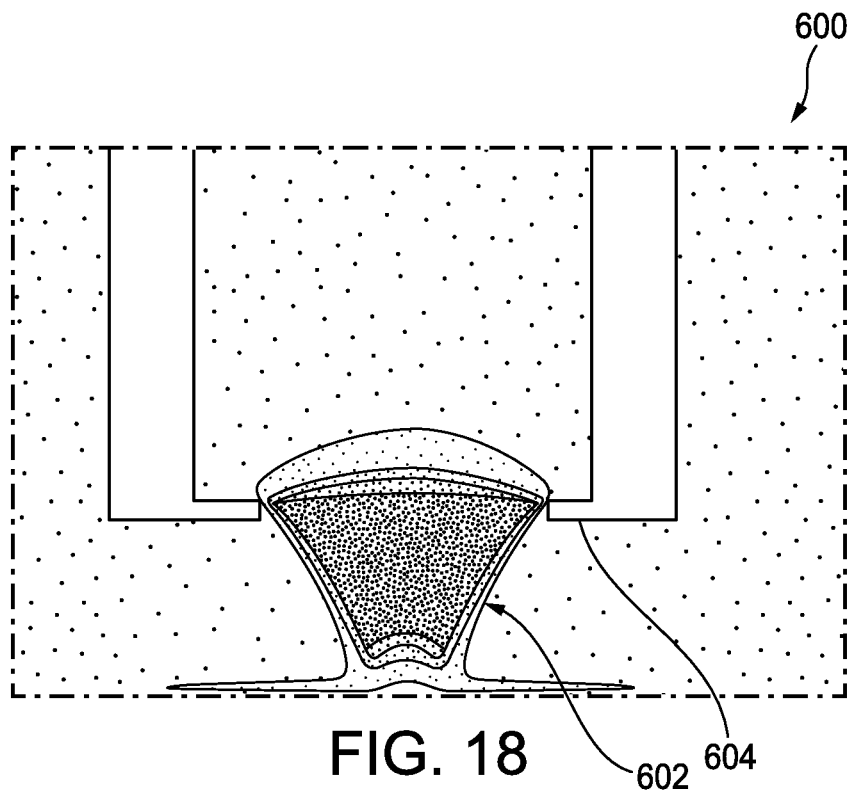
FIG. 18 shows a front view of fluid flow through the nozzle of an impactor separator using computational fluid analysis, according to an example embodiment.
Figure 19:
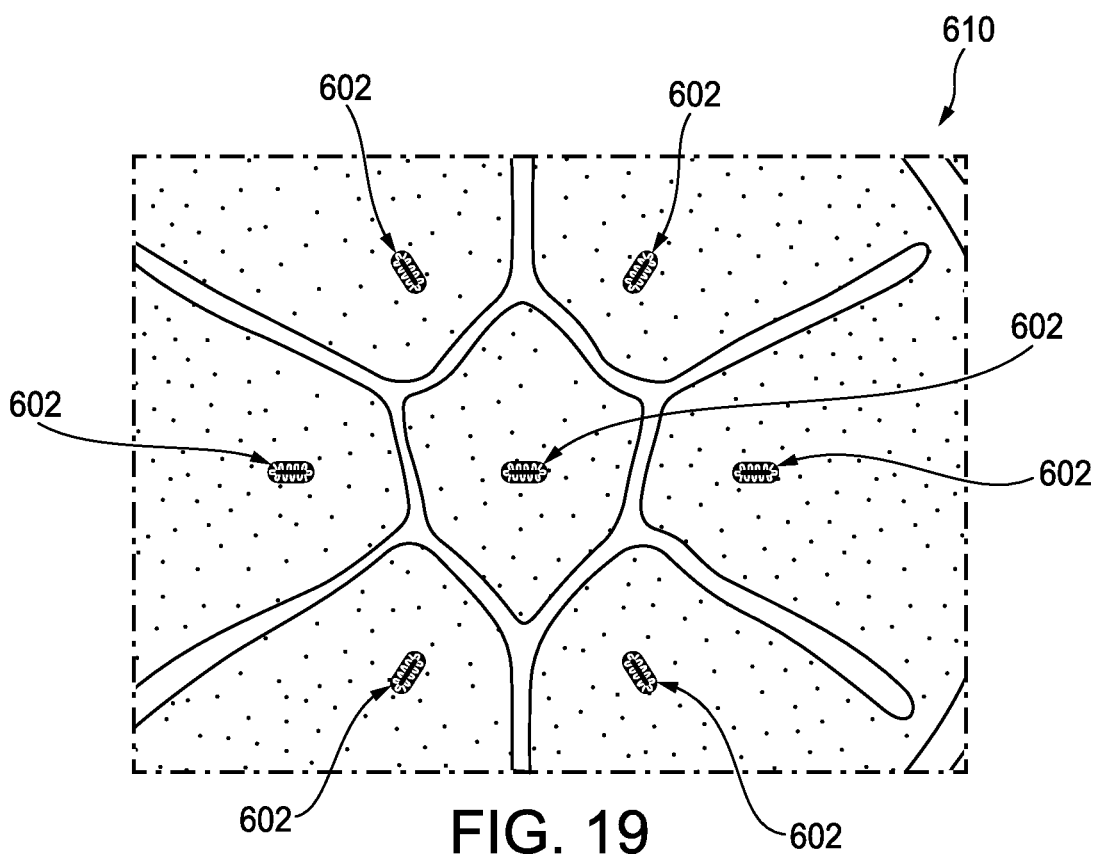
FIG. 19 shows a top view of fluid flow through the nozzle of an impactor separator using computational fluid analysis, according to an example embodiment.

Referring to FIGS. 18-19, a representation of a computational fluid analysis of the fluid flow through a nozzle (e.g., nozzle 150) is shown, according to an example embodiment. As shown in FIG. 18, the fluid flow 602 is directed toward the impaction surface 604 after the fluid exits the nozzle. The fluid flow results in a rectangular impaction patch of approximately 4:1 length-width ratio. As shown in FIG. 19, in some embodiments, the nozzles are positioned with the outlet slit orientation pointed radially toward the centerline (or longitudinal axis 115). In this way, the least possible jet interaction and the least hindrance of the center jet flow occurs.

Figure 20:
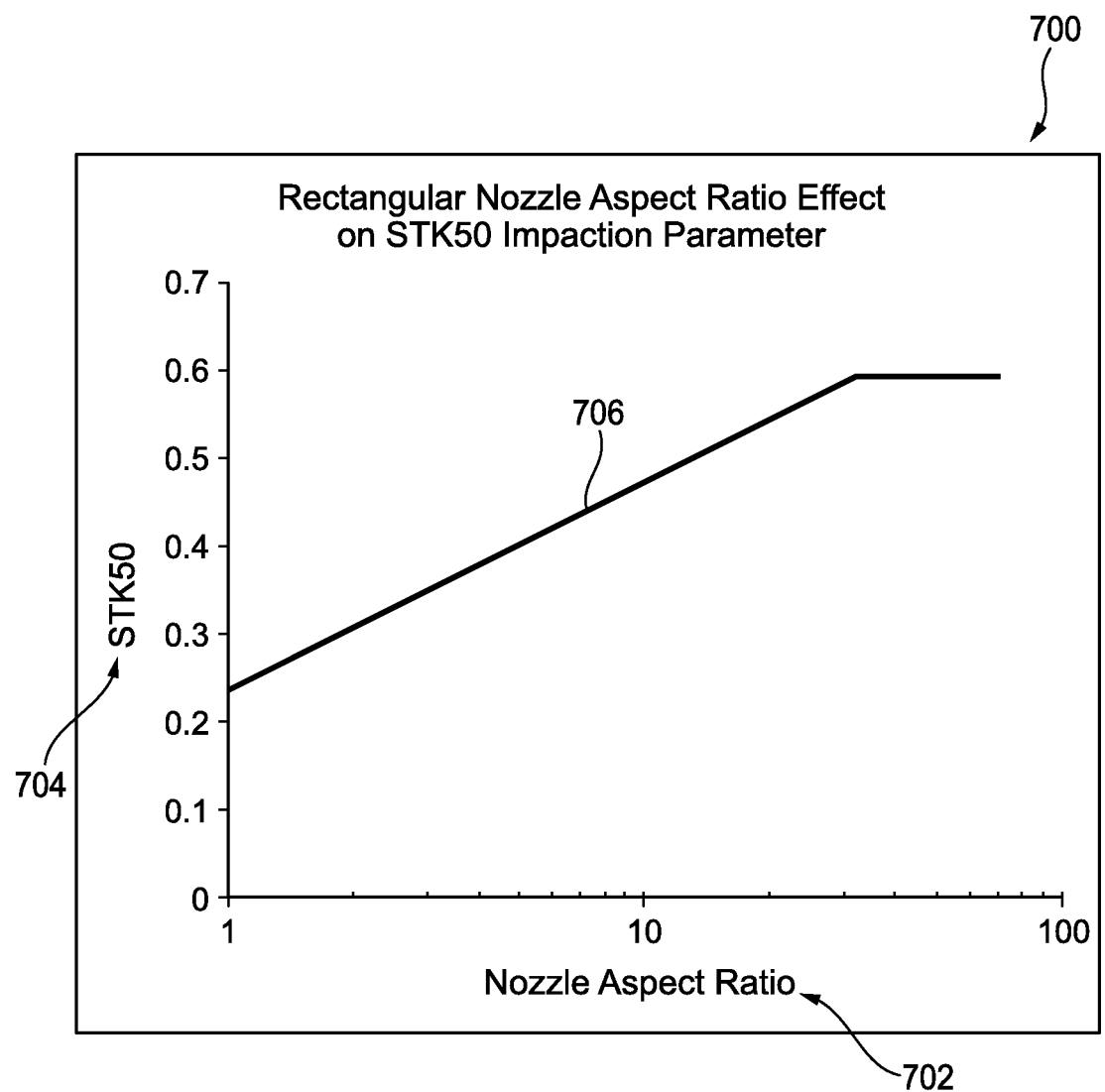
FIG. 20 shows a graph illustrating the effect of a rectangular nozzle aspect ratio on the Stokes number, according to an example embodiment.

Referring to FIG. 20, a graph 700 illustrating the effect of a rectangular nozzle aspect ratio on the Stokes number is shown, according to an example embodiment. As shown by the line graph 706, as the nozzle aspect ratio 702 increases (up to approximately 30:1), the Stokes number 704 increases. For example, the Stokes number 704 for a nozzle aspect ratio of 1:1 (for a circular nozzle orifice) is approximately 0.24 and the Stokes number 704 for a nozzle aspect ratio of 10:1 (for a rectangular nozzle orifice) is approximately 0.45.

Figure 21:
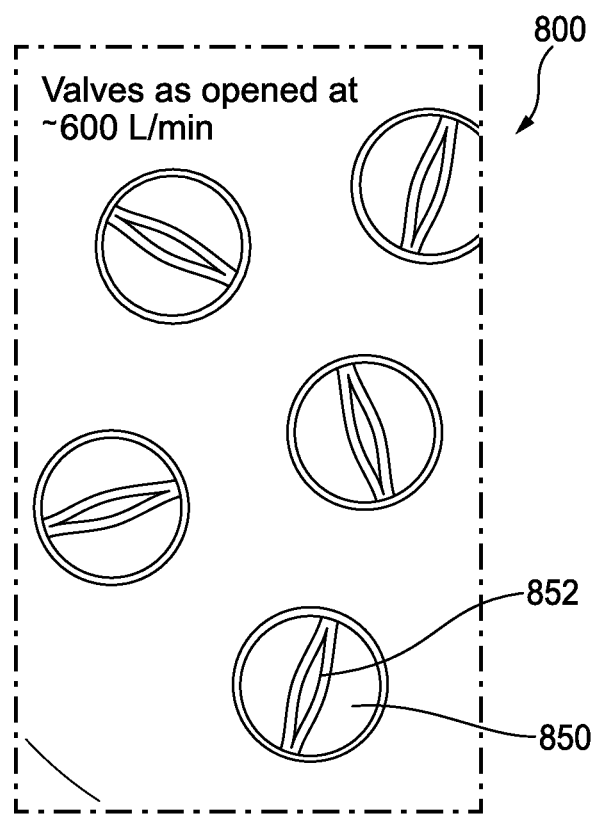
FIG. 21 shows a top view of a portion of a nozzle assembly of the inertial impactor separator of FIG. 1, according to an example embodiment.
Figure 22:
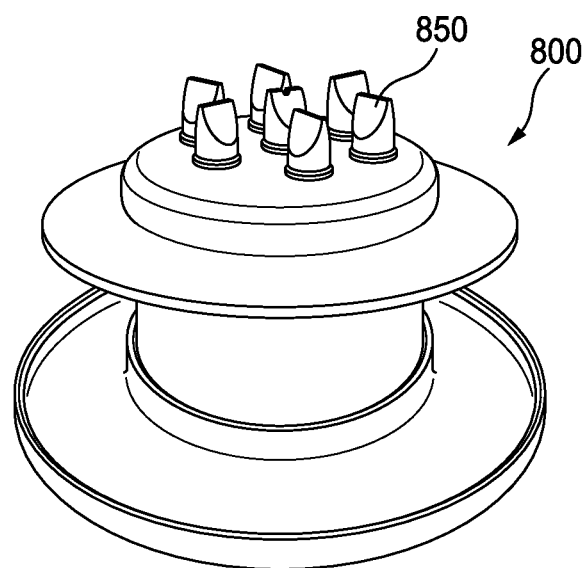
FIG. 22 shows a perspective view of the nozzle assembly of FIG. 21.

Referring to FIGS. 21-22, a separator 800 is shown which includes multiple nozzles 850 having outlets 852. As shown in FIG. 21, the nozzles are shown partially opened at a flowrate of approximately 600 liters/minute.

Figure 23:
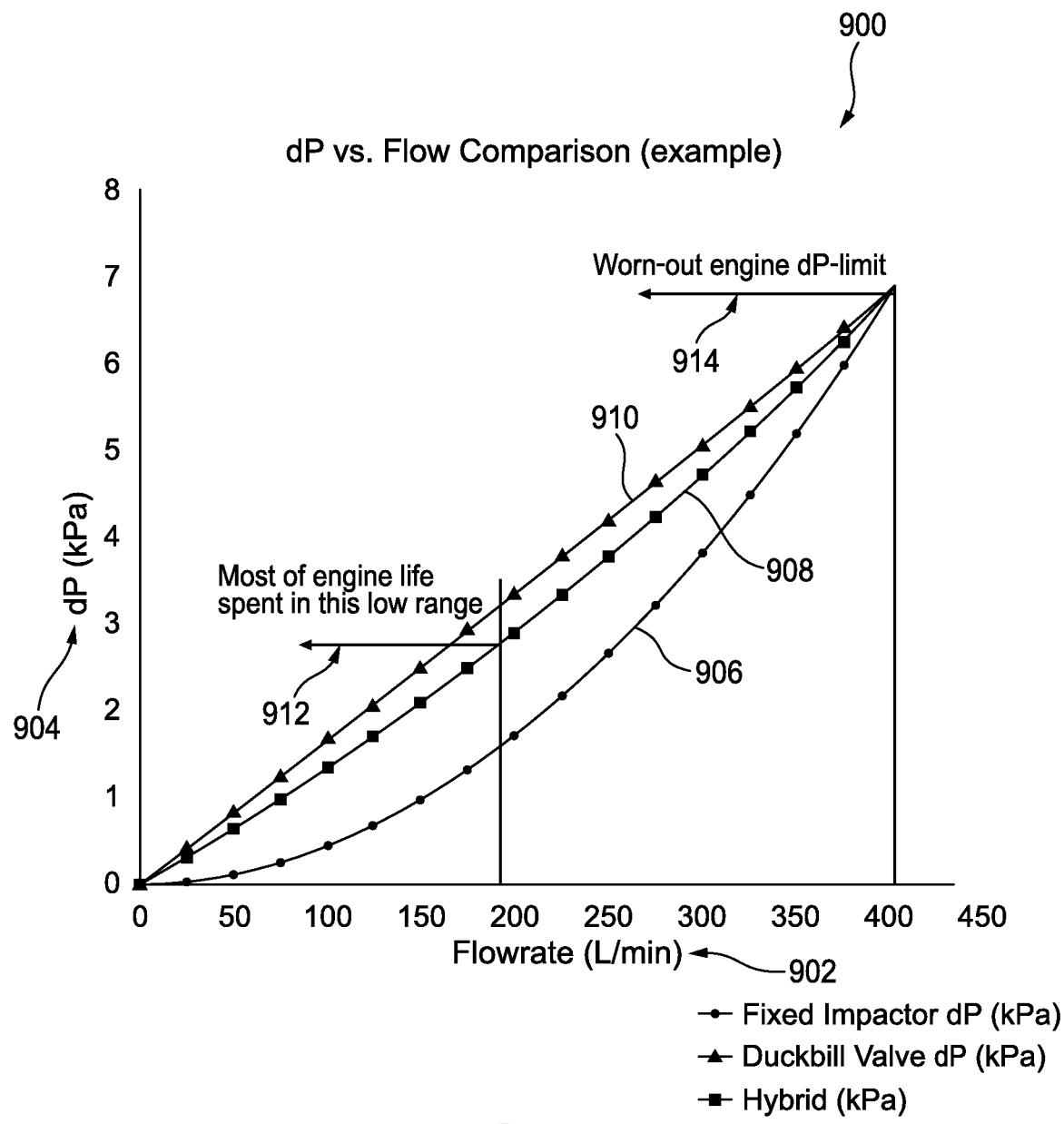
FIG. 23 shows a graph illustrating the effect of various impactor nozzle types on pressure drop relative to fluid flowrate, according to an example embodiment.

Referring to FIG. 23, a graph 900 illustrating the effect of various impactor nozzle types on pressure drop 904 relative to fluid flowrate 902 is shown, according to an example embodiment. A fixed impactor graph 906, a hybrid graph 908, and a duckbill valve graph 910 are shown. As shown, most of the engine life is spent in the low range 912 and a worn-out engine pressure drop limit is shown at 914. The presence of an always-open orifice feature shifts the linear pressure drop response of the duckbill valve to a slight second order, but is still less than the pure quadratic response of a fixed impactor. The higher the pressure drop, the higher the separation efficiency. Thus, the duckbill valve graph 910 illustrates the highest efficiency, and the hybrid graph 908 illustrates a higher efficiency than the fixed impactor graph 906, but a lower efficiency than the duckbill-alone valve graph 910.

Figure 24:
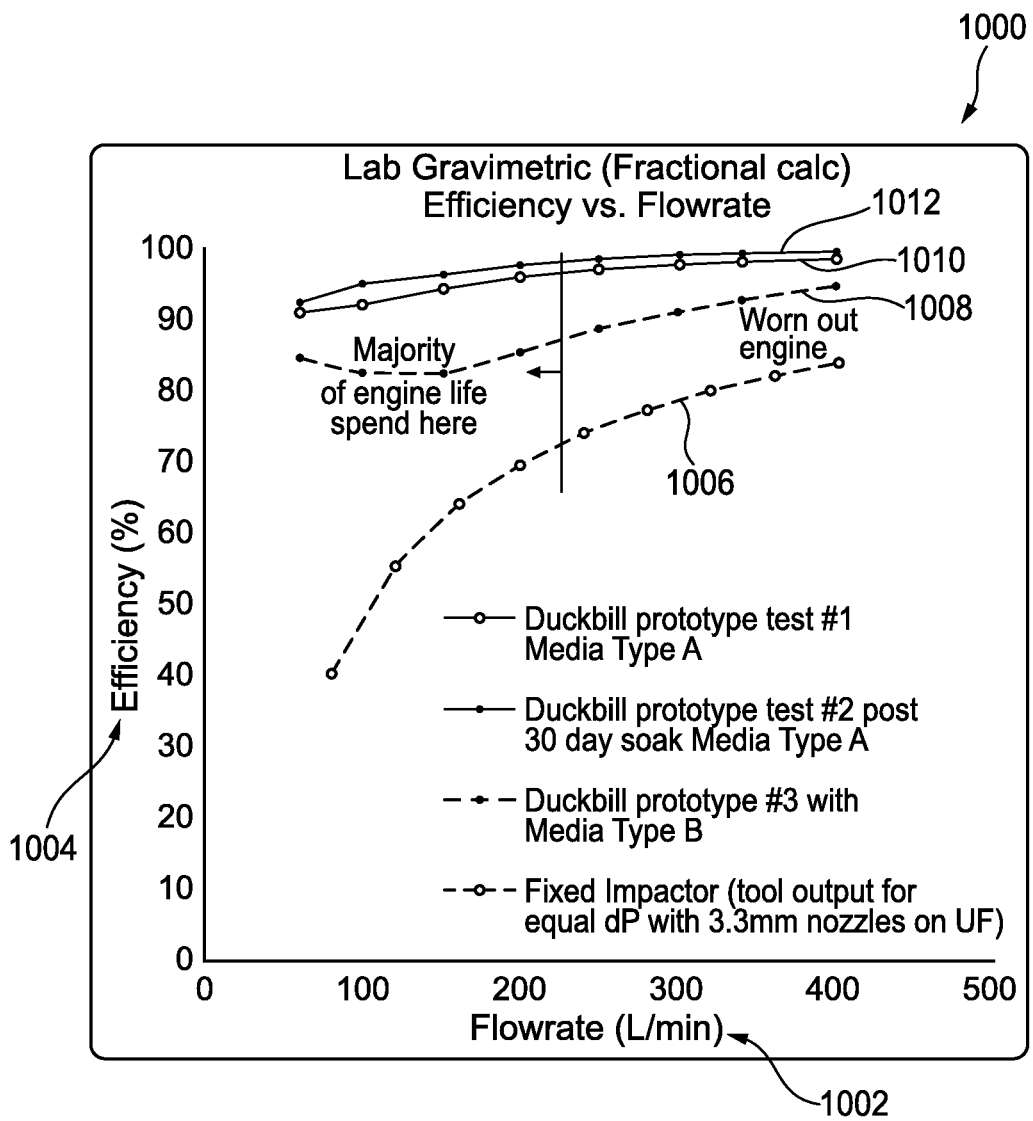
FIG. 24 shows a graph illustrating the effect of various impactor nozzle types on efficiency relative to fluid flowrate, according to an example embodiment.

Referring to FIG. 24, a graph illustrating the effect of various impactor nozzle types on efficiency 1004 relative to fluid flowrate 1002 is shown, according to an example embodiment. A fixed impactor graph 1006, a first duckbill graph 1008, a second duckbill graph 1010, and a third duckbill graph 1012 are shown. As illustrated, impactors using duckbill valves improve significantly upon the efficiency of the fixed impactor, with a similar maximum pressure drop specification at peak flow. The improvement is especially significant in the lower flowrate ranges where an engine will spend the majority of its life.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An impactor separator comprising:
   a housing comprising an inlet receiving a gas-liquid stream and an outlet expelling a gas stream;
   an impaction surface positioned within the housing and configured to separate liquid particles from the gas-liquid stream; and
   a nozzle assembly positioned within the housing having a longitudinal axis and comprising a nozzle assembly housing portion and a plurality of nozzles extending through the nozzle assembly housing portion, each of the plurality of nozzles having a nozzle inlet and a nozzle outlet, the plurality of nozzles comprising:
      a central duckbill valve disposed along the longitudinal axis, the central duckbill valve having an always-open orifice, and
      a plurality of duckbill valves disposed around the central duckbill valve;
   wherein the gas-liquid stream enters into the nozzle assembly housing portion, flows into the plurality of nozzles through the nozzle inlets and exits the plurality of nozzles through the nozzle outlets, wherein the plurality of nozzles accelerates the gas-liquid stream toward the impaction surface.

2. The impactor separator of claim 1, wherein the central duckbill valve is formed integral with the nozzle assembly housing portion.

3. The impactor separator of claim 1, wherein the always-open orifice is circular in shape.

4. The impactor separator of claim 1, wherein the always-open orifice is oval in shape.

5. The impactor separator of claim 1, wherein the nozzle outlet of the central duckbill valve includes a first slot and a second slot, the first slot substantially perpendicular to the second slot.

6. The impactor separator of claim 5, wherein the nozzle outlet further comprises an aperture formed in the center of the nozzle outlet.

7. An impactor separator formed as part of a valve cover, the impactor separator comprising:
   a nozzle assembly positioned within the valve cover having a longitudinal axis, a bottom portion of the valve cover comprising an inlet receiving a gas-liquid stream, and comprising a plurality of nozzles having a nozzle inlet and a nozzle outlet, the plurality of nozzles comprising:
      a central duckbill valve disposed along the longitudinal axis, the central duckbill valve having an always-open orifice, and
      a plurality of duckbill valves disposed around the central duckbill valve; and
   an impaction plate having an impaction surface structured to separate liquid particles from the gas-liquid stream;
   wherein the gas-liquid stream enters into the valve cover, flows into the plurality of nozzles through the nozzle inlets and exits the plurality of nozzles through the nozzle outlets, the plurality of nozzles accelerating the gas-liquid stream toward the impaction surface.

8. The impactor separator of claim 7, wherein the central duckbill valve is formed integral with the nozzle assembly.

9. The impactor separator of claim 7, wherein the always-open orifice is circular in shape.

10. The impactor separator of claim 7, wherein the always-open orifice is oval in shape.

11. The impactor separator of claim 7, wherein the nozzle outlet of the central duckbill valve includes a first slot and a second slot, the first slot extending substantially perpendicular to the second slot.

12. The impactor separator system of claim 11, wherein the nozzle outlet further comprises an aperture formed in the center of the nozzle outlet.

13. A nozzle assembly for use with an impactor separator comprising:
   a nozzle assembly housing portion having a longitudinal axis; and
   a plurality of nozzles extending through the nozzle assembly housing portion, each of the plurality of nozzles having a nozzle inlet and a nozzle outlet, the plurality of nozzles comprising:
      a central duckbill valve disposed along the longitudinal axis, the central duckbill valve having an always-open orifice, and
      a plurality of duckbill valves disposed around the central duckbill valve;
   wherein one of the plurality of nozzles is positioned along the longitudinal axis and comprises an always-open orifice.

14. The nozzle assembly of claim 13, wherein the central duckbill valve is formed integral with the nozzle assembly housing portion.

* * * * *